(12) United States Patent
Wang et al.

(10) Patent No.: US 11,017,545 B2
(45) Date of Patent: May 25, 2021

(54) METHOD AND DEVICE OF SIMULTANEOUS LOCALIZATION AND MAPPING

(71) Applicant: UISEE TECHNOLOGIES (BEIJING) LTD., Beijing (CN)

(72) Inventors: Yahui Wang, Beijing (CN); Shaojun Cai, Beijing (CN)

(73) Assignee: UISEE TECHNOLOGIES (BEIJING) LTD., Beijing (CN)

( * ) Notice: Subject to any disclaimer, the term of this patent is extended or adjusted under 35 U.S.C. 154(b) by 0 days.

(21) Appl. No.: 16/627,768

(22) PCT Filed: Dec. 28, 2018

(86) PCT No.: PCT/CN2018/124786
§ 371 (c)(1),
(2) Date: Dec. 31, 2019

(87) PCT Pub. No.: WO2019/233090
PCT Pub. Date: Dec. 12, 2019

(65) Prior Publication Data
US 2021/0082137 A1 Mar. 18, 2021

(30) Foreign Application Priority Data

Jun. 7, 2018 (CN) .......................... 201810578095.3
Nov. 22, 2018 (CN) .......................... 201811401646.5

(51) Int. Cl.
*G06T 7/579* (2017.01)
*G06T 7/73* (2017.01)
*G06T 7/246* (2017.01)

(52) U.S. Cl.
CPC .............. *G06T 7/579* (2017.01); *G06T 7/248* (2017.01); *G06T 7/74* (2017.01); *G06T 2207/30244* (2013.01)

(58) Field of Classification Search
None
See application file for complete search history.

(56) References Cited

U.S. PATENT DOCUMENTS

| 2013/0182894 | A1 | 7/2013 | Kim et al. |
| 2016/0026253 | A1* | 1/2016 | Bradski ............... H04N 13/344 345/8 |
| 2019/0094981 | A1* | 3/2019 | Bradski ................... G06F 3/011 |

FOREIGN PATENT DOCUMENTS

| CN | 106846467 A | 6/2017 |
| CN | 107862744 A | 3/2018 |
| CN | 108776976 A | 11/2018 |

OTHER PUBLICATIONS

International Search Report and Written Opinion of the International Searching Authority for PCT/CN2018/124786.

* cited by examiner

*Primary Examiner* — Delomia L Gilliard
(74) *Attorney, Agent, or Firm* — Fideli Law PLLC

(57) ABSTRACT

The present application relates to a method, a device, and a non-transitory computer-readable medium for simultaneously positioning and mapping. The method for simultaneous positioning and mapping includes: obtaining a large field of view image through a large field of view camera; obtaining an undistortion image corresponding to the large field of view image based on a multi-virtual pinhole camera model; and determining the pose of the large field of view camera based on the undistortion image and creating a map. The multiple virtual pinhole camera model includes at least two virtual pinhole cameras with different orientations, and a camera center of the at least two virtual pinhole cameras with different orientations coincides with a camera center of the large field of view camera.

20 Claims, 5 Drawing Sheets

METHOD AND DEVICE OF SIMULTANEOUS LOCALIZATION AND MAPPING

RELATED APPLICATIONS

The present patent document is a national stage of PCT Application Serial No. PCT/CN2018/124786, filed Dec. 28, 2018, designating the United States and published in Chinese, which claims the benefit of priority to Chinese Patent Application No. CN201810578095.3, filed Jun. 7, 2018, and Chinese Patent Application No. CN201811401646.5, filed Nov. 22, 2018, the entire contents of each of which are incorporated herein by reference.

TECHNICAL FIELD

The present invention relates to the field of simultaneous localization and mapping, and more particularly to the field of simultaneous localization and mapping based on a large field-of-view camera.

BACKGROUND

Simultaneous Localization and Mapping (SLAM) is the technology for localization and navigation, etc. by means of tracking robot movements in real time and simultaneously establishing a surrounding environment map.

The camera used in the traditional SLAM is a perspective camera (also referred to as a pinhole camera). Due to the limited field-of-view angle of the camera, the common features shared by the acquired images are insufficient, which may result in loss of tracking of the SLAM algorithm. Compared with the pinhole camera used in the traditional SLAM, a large-field-of-view camera has a larger field-of-view angle, thus has attracted extensive attentions, and has been widely studied.

There are two main SLAM technical solutions based on large field-of-view images.

In one technical solution, the traditional undistortion method is employed to undistort the large field-of-view image obtained by a large field-of-view camera, and then the traditional SLAM technology is utilized with the undistorted image as a normal image to achieve simultaneous localization and mapping. This technical solution is simple and easy, but the traditional undistortion method may result in the loss of a lot of field-of-view angles, and the wide field-of-view angle feature of a large field-of-view camera cannot be fully utilized.

In the other technical solution, the SLAM process is directly performed with a large field-of-view image without any distortion correction based on a large field-of-view camera imaging model. That is, features are directly extracted from a large field-of-view image without any distortion correction. However, the features extracted by this solution may be affected by image distortion; in addition, the complex large field-of-view camera imaging model may cause the optimization to become extremely complex, thereby affecting the performance of the system.

Therefore, there is an urgent need for a new SLAM technology that can preserve all the fields of a large field-of-view camera while avoiding the effects of image distortion, meanwhile it can implement the detection, localization and mapping of the depth of field.

BRIEF SUMMARY

The purpose of this disclosure is to provide a method of simultaneous localization and mapping. This method can, based on the multi-virtual pinhole camera model, undistort a large field-of-view image obtained by a large field-of-view camera, and perform simultaneous positioning and mapping based on the undistorted image.

In one aspect of the present disclosure, a method of simultaneous localization and mapping is provided. More specifically, the method includes: undistorting a large field-of-view image obtained by a large field-of-view camera based on a multi-virtual pinhole camera model to obtain an undistorted image; and then determining a pose of the large field-of-view camera and constructing a map based on the undistorted image. The multi-virtual pinhole camera model includes at least two virtual pinhole cameras of different orientations, and camera centers of the at least two differently oriented virtual pinhole cameras coincide with a camera center of the large field-of-view camera.

In another aspect of the present disclosure, a device of simultaneous localization and mapping is provided. The device includes: at least one storage device including a set of instructions; and at least one processor in communication with the at least one storage device, wherein when the set of instructions are executed, the at least one processor is configured to cause the simultaneous positioning and mapping device to: obtain a large field-of-view image by a large field-of-view camera: obtain an undistorted image corresponding to the large field-of-view image based on a multi-virtual pinhole camera model; and determine a pose of the large field-of-view camera and construct a map based on the undistorted image, wherein the multi-virtual pinhole camera model includes at least two virtual pinhole cameras of different orientations, and camera centers of the at least two differently oriented virtual pinhole cameras coincide with a camera center of the large field-of-view camera.

Additional features of this disclosure are described in part in the description below. By this exposition, the contents described in the following drawings and embodiments become apparent to those skilled in the art. The invention points in this disclosure can be fully explained by practicing or using the methods, means, and combinations thereof set forth in the detailed examples discussed below.

BRIEF DESCRIPTION OF THE DRAWINGS

The following drawings describe in detail the exemplary embodiments, disclosed in this disclosure. The same diagram markup represents a similar structure in several views of the diagram. A person of ordinary skill in the art will appreciate that these embodiments are non-restrictive, exemplary embodiments, and that the drawings are for illustrative and descriptive purposes only and are not intended to limit the scope of this disclosure, and that other embodiments may similarly fulfill the intent of the invention in this disclosure. It should be understood that the drawings are not drawn to scale.

DETAILED DESCRIPTION OF THE DRAWINGS

The following description provides specific application, scenarios and requirements of this disclosure, in order to enable those skilled in the art to make and use the content of this application. Various modifications to the disclosed embodiments will be apparent to those skilled in the art, and the general principles defined herein can be applied to other embodiments without departing from the spirit and scope of the disclosure. Accordingly, the disclosure is not limited to the illustrated embodiments, but is the broadest scope consistent with the claims.

The terminology used herein is for the purpose of describing particular example embodiments only and is not limiting. For example, as used herein, the singular forms "a", "an" and "the" may include plural forms unless the context expressly states otherwise. When used in this specification, the terms "comprising", "including" and/or "containing" mean that the associated integer, step, operation, element and/or component exists, but does not exclude one or more other features, integers, steps, operations, elements, components, and/or others that can be added to the system/method.

In consideration of the following description, these and other features of the present disclosure, as well as the operation and function of related elements of the structure, and the economics of the combination and manufacture of components can be significantly improved. With reference to the drawings, all of which form part of the present disclosure. It should be clearly understood, however, that the drawings are for the purpose of illustration and description only and are not intended as a definition of the limits of the disclosure.

The flow chart used in this disclosure illustrates the operation of the system implemented according to some embodiments in this disclosure. It should be clearly understood that the operations of the flowchart can be implemented out of sequence. Instead, operations can be implemented in reverse order or simultaneously. In addition, one or more other operations can be added to the flowchart or removed from the flowchart.

One aspect of the present disclosure relates to a method of simultaneous localization and mapping. More specifically, the method includes: undistorting a large field-of-view image obtained by a large field-of-view camera based on a multi-virtual pinhole camera model to obtain an undistorted image; and then determining a pose of the large field-of-view camera and constructing a map based on the undistorted image. The multi-virtual pinhole camera model includes at least two virtual pinhole cameras of different orientations, and camera centers of the at least two differently oriented virtual pinhole cameras coincide with a camera center of the large field-of-view camera.

Figure 1:
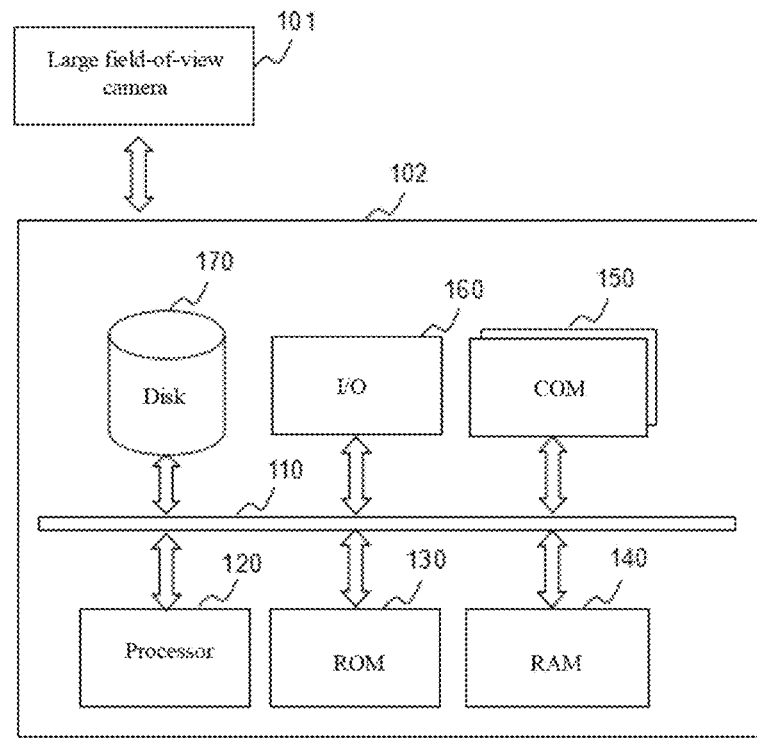
FIG. 1 is a schematic representation of the simultaneous localization and mapping, system, in accordance with some embodiments of the present disclosure.

FIG. 1 shows a system of simultaneous localization and mapping as shown in some embodiments of the present application.

The system of simultaneous localization and mapping 100 can obtain a large field-of-view image and execute a method of simultaneous localization and mapping. Hence, the method of simultaneous localization and mapping may refer to the descriptions of FIG. 2 to FIG. 11.

As shown in the figures, the system of simultaneous localization and mapping 100 may include a large field-of-view camera 101 and a device of simultaneous localization and mapping 102. The large field-of-view camera 101 and the device of simultaneous localization and mapping 102 may be installed as a whole or separately. For easily describing the invention points of the present disclosure, the large field of view camera in the present disclosure is exemplified by a fisheye camera.

The large field-of-view camera 101 is used to acquire a fisheye image of a scene or object. In some embodiments, the large field-of-view camera 101 may be a fisheye camera, a catadioptric camera, a panoramic imaging camera. In some embodiments, the large field-of-view camera 101 may be a monocular large field-of-view camera, a binocular large field-of-view camera, or a multi-view large field-of-view camera.

As an example, the large field-of-view camera 101 includes a monocular fisheye camera and a binocular fisheye camera. The left camera of the binocular fisheye camera is called the left, eye; the right camera of the binocular fisheye camera is called the right eye. An image acquired by the left eye is called the left fisheye image (left field-of-view image), and an image acquired by the right eye is called the right fisheye image (right field-of-view image).

The device of simultaneous localization and mapping 102 may be an exemplary computing device that can execute the method of simultaneous localization and mapping.

In some embodiments, the device of simultaneous localization and mapping 102 may include a COM port 150 to facilitate data communication. The device of simultaneous localization and mapping 102 may further include a processor 120, which is configured to execute computer instructions in the form of one or more processors. Computer instructions may include, for example, routines, programs, objects, components, data structures, procedures, modules, and functions that perform specific functions described in text. For example, the processor 120 may determine an undistorted image corresponding to the large field-of-view image based on a multi-virtual pinhole camera model. As another example, the processor 120 may determine a pose of the large field-of-view camera 101 and construct a map based on the undistorted image.

In some embodiments, the processor 120 may include one or more hardware processors, such as a microcontroller, a reduced instruction set computer (RISC), an application specific integrated circuit (ASIC), an application-specific instruction-set processor (ASIP)), an central processing unit (CPU), a graphics processing unit (GPU), a physical processing unit (PPU), a microcontroller unit, a digital signal processor (DSP), a field programmable gate array (FPGA), an advanced RISC machine (ARM), a programmable logic device (PLD), any circuit or processor, etc., or any combination thereof capable of performing one or more functions.

In some embodiments, the device of simultaneous localization and mapping 102 may include an internal communication bus 110, program storage, and different forms of data storage (e.g., disk 170, read-only memory (ROM) 130, or random-access memory (RAM) 140). The device of simultaneous localization and mapping 102 may also include program instructions stored in ROM 130, RAM 140, and/or other types of non-transitory storage media to be executed by processor 120. The methods and/or processes, of the present disclosure may be implemented as program instructions. The device of simultaneous localization and mapping 102 also includes an I/O component 160 that supports input/output between the computer and other components (e.g., user interface elements). The device of simultaneous localization and mapping 102 may further include receiving programming and data through network communication.

For the purpose of illustration, only one processor is described in the device of simultaneous localization and mapping 102 in this disclosure. However, it should be noted that the device of simultaneous localization and mapping 102 in this disclosure may also include multiple processors, so the operations and/or method steps disclosed may be performed by one processor as described in this disclosure or by a combination of multiple processors. For example, if the device of simultaneous localization and mapping 102 performs step A and step B at the same time, it should be understood that step A and step B can also be performed jointly or separately by two different processors in information processing. (For example, the first processor performs step A, the second processor performs step B, or the first and second processors collectively perform step A and step B).

Figure 2:
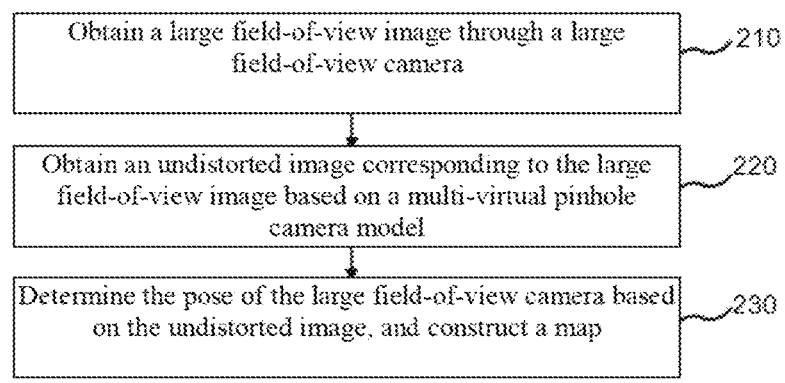
FIG. 2 is a flow chart of a method of simultaneous localization and mapping, in accordance with some embodiments of the present disclosure.

FIG. 2 shows a flow chart of a method of simultaneous localization and mapping as shown in some embodiments of the present application. The process 200 may be implemented as a set of instructions in a non-transitory storage medium in the device of simultaneous localization and mapping 102. The device of simultaneous localization and mapping 102 may execute the set of instructions and accordingly perform the steps in the process 200.

The operations of the illustrated process 200 presented below are intended to be illustrative not limiting. In some embodiments, one or more additional operations not described may be added to the process 200, and/or one or more operations described herein may be deleted. Furthermore, the order of operations shown in FIG. 2 and described below is not a limitation on this.

In 210, the device of simultaneous localization and mapping 102 may obtain a large field-of-view image through the large field-of-view camera 101.

In the case where the large field-of-view camera 101 is a monocular large field-of-view camera, the monocular large field-of-view camera may acquire a large field-of-view image; while when the large field-of-view camera 101 is a binocular large field-of-view camera, the binocular large field-of-view camera may acquire a large field-of-view image, which may include a left field-of-view image and a right field-of-view image.

In 220, the device of simultaneous localization and mapping 102 may obtain an undistorted image corresponding to the large field-of-view image based on, a multi-virtual pinhole camera model.

In the case where the large field-of-view camera 101 is a monocular large field-of-view camera, the device of simultaneous localization and mapping 102 may obtain an undistorted image corresponding, to the large field-of-view image based on a multi-virtual pinhole camera model.

The aforementioned multi-virtual pinhole camera model includes at least two virtual pinhole cameras of different orientations, and camera centers of the at least two differently oriented virtual pinhole cameras coincide with a camera center of the large field-of-view camera.

In the case where the large field-of-view camera 101 is a binocular large field-of-view camera, the device of simultaneous localization and mapping 102 may obtain a left undistorted image corresponding to a left field-of-view image based on a first multi-virtual pinhole camera model, and obtain a right undistorted image corresponding to a right field-of-view image based on a second multi-virtual pinhole camera model, where the first multi-virtual pinhole camera model and the second multi-virtual pinhole camera model may be the same or different.

The first multi-virtual pinhole camera model may include at least two virtual pinhole cameras of different orientations, and the camera centers of the at least two differently oriented virtual pinhole cameras coincide with the camera center of the left eye camera of the large field-of-view camera 101. The second multi-virtual pinhole camera model may include at least two virtual pinhole cameras of different orientations, and the camera centers of the at least two differently oriented virtual pinhole cameras coincide with the camera center of the righteye camera of the large field-of-view camera 101.

Figure 3:
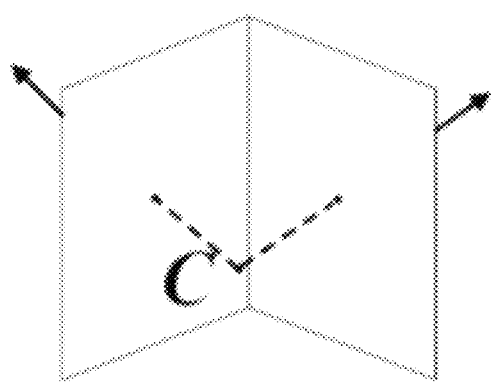
FIG. 3 is a schematic representation of a multi-virtual pinhole camera model having two orientations, in accordance with some embodiments of the present disclosure.

As an example, FIG. 3 illustrates a multi-virtual pinhole camera model having two orientations in accordance with some embodiments of the present application. The orientations of the two virtual pinhole cameras have an angle of 90 degrees, and the camera centers thereof coincide with the camera center of the large field-of-view camera at point C.

Figure 4:
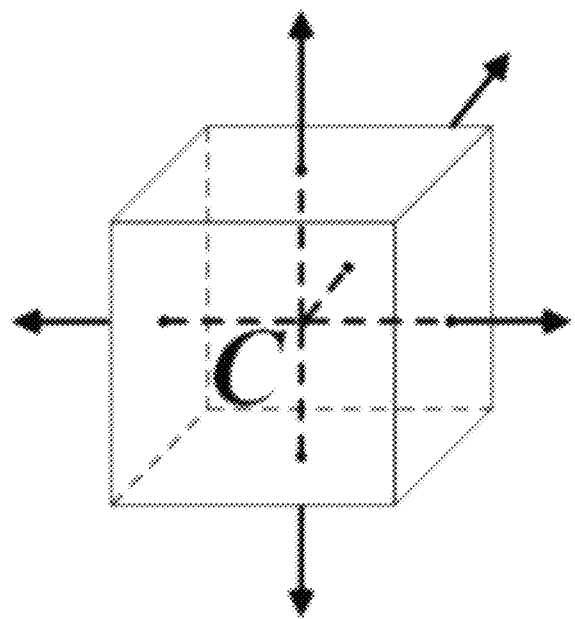
FIG. 4 is a schematic representation of a multi-virtual pinhole camera model having five orientations, in accordance with some embodiments of the present disclosure.

As an example, FIG. 4 illustrates a multi-virtual pinhole camera model having five orientations in accordance with, some embodiments of the present application. As shown in the figure, the multi-virtual pinhole camera model includes virtual pinhole cameras with a forward, upper, lower, left, and right orientation of a cube respectively for a total of five orientations. The camera centers of the five virtual pinhole cameras coincide with the camera center of the large field-of-view camera at point C. In this case, the aforementioned undistortion method is referred to as a cubemap-based undistortion method (hereinafter referred to as a cube model).

Specifically, the device of simultaneous localization and mapping 102 may project a large field-of-view image (or a left field-of-view image, a right field-of-view image) to a multi-virtual pinhole camera model (or a first multi-virtual pinhole camera model, a second multi-virtual pinhole camera model) to obtain the projection map of the virtual pinhole cameras of at least two different orientations, and then the projection map of the virtual pinhole cameras of at least two different orientations is expanded to obtain an undistorted image corresponding to the left fisheye image.

Figure 5:
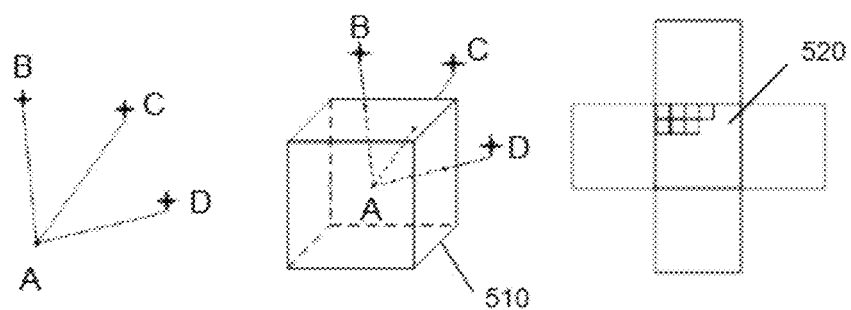
FIG. 5 is a schematic representation of undistortion based on a multi-virtual pinhole camera model, in accordance with some embodiments of the present disclosure.

Referring to FIG. 5, it is a schematic diagram of undistortion based on a multi-virtual pinhole camera model in accordance with some embodiments of the present application. Hereinafter, the first multi-virtual pinhole camera model and the left field-of-view image are taken as, an example for detailed description.

Point A is the camera center of a left eye camera of a binocular large field-of-view camera, and point B, point C and point D are exemplary pixels in the left field-of-view image. A first multi-virtual pinhole camera 510 is a cube model including virtual pinhole cameras of five different orientations, which are, respectively, a front-facing, an upper-facing, a lower-facing, a left-facing, and a right-facing orientation of the cube. The camera centers of the five oriented virtual pinhole cameras coincide at point A.

As shown in the figure, the left field-of-view image is projected onto the imaging planes of five differently oriented virtual pinhole cameras of the first multi-virtual pinhole camera model 510. Accordingly, projection maps of five different orientations can be obtained. The left undistorted image thus may be obtained by expanding the projection maps of five different orientations.

Figure 6:
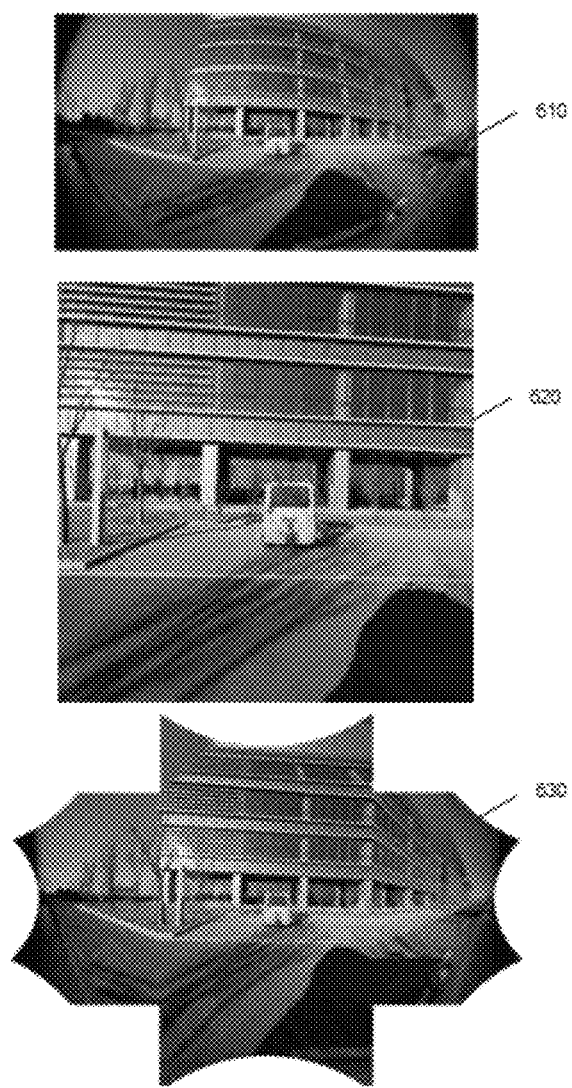
FIG. 6 is a schematic representation of an original monocular fisheye image, a conventional undistorted monocular fisheye image, and a undistorted monocular fisheye image obtained by the method of the present disclosure.

Referring to FIG. 6, it is an original monocular fisheye image, a conventional undistorted monocular fisheye image, and an undistorted monocular fisheye image obtained by the method of the present disclosure.

The image 610 is a large field-of-view image taken by a monocular fisheye camera. It can be seen that the large field-of-view image has a wider field-of-view than an image obtained by a conventional camera, but the image has spatial distortion, and the farther away from the center of the image, the larger the distortion.

The image 620 is an undistorted image obtained by undistorting the large field-of-view image by a conventional undistortion method. The angle of view of an image obtained by a conventional camera is generally about 80 degrees, while the angle-of-view of the image 620 is 100 degrees. Although the angle-of-view the image obtained by the conventional camera is improved, lots of angles-of-view are lost as compared to the image before the undistortion processing. As a result, a map of all angles-of-view including a large field-of-view image cannot be obtained.

The image 630 is an undistorted large field-of-view image based on a five-oriented multi-virtual pinhole camera model in accordance with some embodiments of the present invention, i.e., an undistorted image obtained by a cube model. As shown, the image 630 retains all of the angles-of-view of the large field-of-view image. Thus, the SLAM based on this undistorted large field-of-view image may be able to construct a map including all of the original angles-of-view contents.

Figure 7:
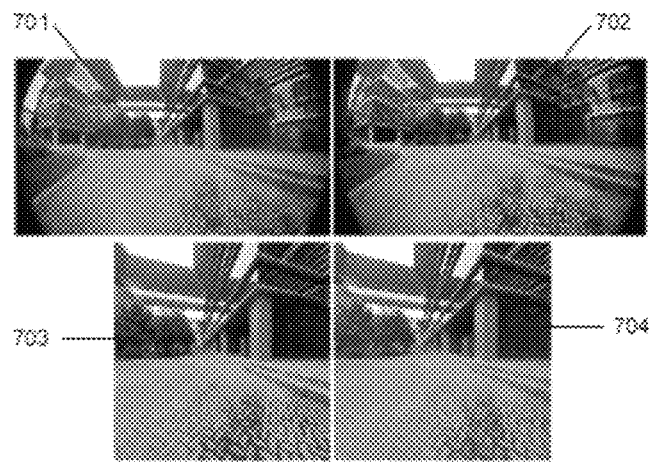
FIG. 7 is a schematic representation of an original binocular fisheye image and a conventional undistorted binocular fisheye image, in accordance with some embodiments of the present disclosure.

FIG. 7 illustrates an original binocular fisheye image and a conventional undistorted binocular fisheye image in accordance with some embodiments of the present application.

As shown, the image 701 and the image 702 are an original left fisheye image and an original right fisheye image acquired by the large field-of-view camera 101 in real practice, respectively. The image 703 and the image 704 are a conventional undistorted left image and a conventional undistorted right image, respectively.

As a comparison with the undistorted left image and the right undistorted left image (both shown in the figure) processed by the cube model, the image 601 and image 602 each are a single image obtained by a conventional undistortion method, and the angles-of-view of the image in both horizontal direction and vertical direction are only 100 degrees. It can be seen that for the large-view image acquired by the large field-of-view camera 101, the undistortion method provided by the present application can effectively prevent image distortion while retaining a large angle-of-view.

In 230, the device of simultaneous localization and mapping 102 may determine the pose of the large field-of-view camera 102 based on the undistorted image, and construct a map.

In some embodiments, for a monocular large field-of-view camera, the device of simultaneous localization and mapping 102 may extract the feature points of an undistorted image and then construct a corresponding large field-of-view frame based on the extracted feature points; subsequently, the pose of the monocular large field-of-view camera may be determined based on the large field-of-view frame, and a map may constructed accordingly.

Optionally, by means of extracting the feature points of the large field-of-view undistorted image, that is, the key points and descriptors of the large field-of-view undistorted image, the pose of the camera's motion may be tracked based on the feature points of the large field-of-view undistorted image, and a map may also be constructed accordingly. Optionally, the pose of the camera's motion may be estimated directly based on the pixel brightness information in the large field-of-view undistorted image, and the map may be constructed without calculating the key points and descriptors.

The large field-of-view undistorted image obtained by the above method based on multi-virtual pinhole camera model undistortion preserves all angles-of-view of the original large field-of-view image. This allows simultaneous localization and mapping based on rich common features between large field-of-view images for more efficient localization and more accurate mapping. At the same time, the above method may also avoid extra computational costs of a complex projection model of a large field-of-view camera.

In some embodiments, for a binocular large field-of-view camera, the device of simultaneous localization and mapping 102 may extract the feature points of the left undistorted image and the right undistorted image, and then construct a corresponding binocular image frame based on the extracted feature points; next the pose of the binocular large field-of-view camera may be determined based on the binocular image frame, and a map may be constructed accordingly.

Since the large field-of-view frame (or binocular image frame) includes information of all the feature points in the undistorted image (or the left undistorted image, the right undistorted image), it is possible to track the pose of the large field-of-view camera 101 and then construct a map accordingly.

As an example, the device of simultaneous localization and mapping 102 may scale up and down the undistorted image (or the left undistorted image, the right undistorted image) to obtain an image pyramid corresponding to, the undistorted image (or the left undistorted image, the right undistorted image). Corner points may be extracted in each scaled image of the image pyramid and the descriptors may be calculated accordingly. The corner points and the descriptors constitute the feature points of the image. A corner point is a region of high recognizability and representativeness in the image, and is used to indicate the position information of a feature point in the image. A descriptor may be represented by a vector and is used to describe the information of the pixels around a corner point. Descriptors can be designed as that the feature points with similar appearance have similar descriptors.

The feature points are extracted for an undistorted image (or the left undistorted image, the right undistorted image), and a corresponding large field-of-view frame (or binocular image frame) may be constructed based on the extracted feature points. A large field of view frame (or binocular image frame) includes all of the feature points in the corresponding undistorted image (or the left undistorted image, the right undistorted image). After the large field-of-view frame (or binocular image frame) is constructed, the pixel data of the undistorted image (or the left undistorted image, the right undistorted image) corresponding to the large field-of-view frame (or the binocular image frame) may be discarded, thereby saving storage space and reducing system power consumption.

Figure 8:
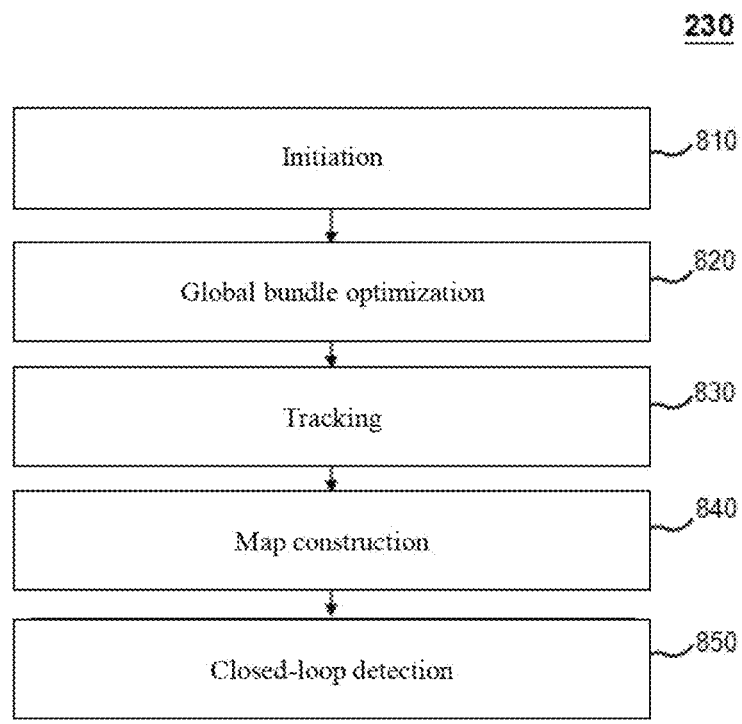
FIG. 8 is a flow chart for determining a camera pose and constructing a map, in accordance with some embodiments of the present disclosure.

For more detailed description regarding step 230 please refer to FIG. 8 and associated descriptions.

It should be noted that when the large field-of-view camera 101 is a binocular large field-of-view camera, the optical axes of the left eye and right eye of the binocular large field-of-view camera may not be parallel to each other. Accordingly, the process 200 may further include parallelizing optical axes of the left eye and right eye of the large field-of-view camera 101. For example, the device of simultaneous localization and mapping 102 may adjust the virtual optical axes of the left and right eyes of a binocular fisheye camera through a binocular camera calibration program, so that the virtual optical axes of the two are parallel.

FIG. 8 illustrates a flow chart for determining a camera pose and constructing a map, in accordance with some embodiments of the present application. The process 230 may be implemented as a set of instructions in a non-transitory storage medium in the device of simultaneous localization and mapping 102. The device of simultaneous localization and mapping 102 may execute the set of instructions and perform the steps in the process 200 accordingly.

The operations of the process 230 presented described below are intended to be illustrative and not limiting. In some embodiments, the process 230 may, when implemented, be added with one or more additional operations not described herein, and/or delete one or more of the operations described herein. Moreover, the order of the operations shown in FIG. 8 and described below is not limited.

In 810, the device of simultaneous localization and mapping 102 may perform an initialization step, which may construct an initial map.

For a monocular large field-of-view camera, the device of simultaneous localization and mapping 102 may obtain the undistorted images of two different moments (or a large field-of-view frames); determine the matching feature points, of the undistorted images (or large field-of-view frames) of two different moments, and then construct, an initial map based on the matching feature points.

As an example, the device of the simultaneous localization and mapping 102 may obtain an undistorted image (or a large field-of-view frame) corresponding to a first moment and another undistorted image (or another large field-of-view frame) corresponding to a second moment; determine matching feature points between the undistorted image (or large field-of-view frame) corresponding to the first moment and the undistorted image (or large field-of-view frame) corresponding to the second moment; and then construct an initial map on the matching feature points.

In some embodiments, the large field-of-view frame corresponding to the first moment and the large field-of-view frame corresponding, to the second moment may be the current large field-of-view frame and the reference large field-of-view frame, respectively. The current large field-of-view frame and the reference large field-of-view frame may be consecutive frames, or may have one or more frames therebetween. A certain parallax needs to exist between the current large field-of-view frame and the reference large field-of-view frame in order to ensure smooth initialization.

In some embodiments, the device of simultaneous localization and mapping 102 may, based on a multi-virtual pinhole camera model (e.g., the multi-virtual pinhole camera model shown in FIG. 4), decompose the undistorted image (or large field-of-view frame) corresponding to the first moment and the undistorted image (or large field-of-view frame) corresponding to the second moment into the sub-field-of-view frames respectively corresponding to each virtual pinhole camera. Therefore, for each virtual pinhole camera, two sub-field-of-view frames can be obtained, and the two sub-field-of-view frames are respectively derived from the undistorted image (or large field-of-view frame) corresponding to the first moment and the undistorted image (or large field-of-view frame) corresponding to the second moment. The matching feature points may be determined by inter-frame matching between the two sub-field-of-view frames.

In some embodiments, the step of constructing the initial map based on the matching feature points includes: determining a direction vector corresponding to a first feature point based on the feature points of the undistorted image corresponding to the first moment and a camera center of the large field-of-view camera at the first moment; determining a direction vector corresponding to a second feature point based on the feature points of the undistorted image corresponding to the second moment and a camera center of the large field-of-view camera at the second moment; and then performing a triangulation measurement with the direction vector corresponding to the first feature point and the direction vector corresponding to the second feature point, determining map points corresponding to these feature points; and then constructing an initial map based on the map, points.

Specifically, the device of simultaneous localization and mapping 102 may decompose the reference large field-of-view frame F1, based on the multi-virtual pinhole camera model into sub-field-of-view frames F11, F12, F13, F14 and F15 respectively corresponding to each virtual pinhole camera. In addition, the current large field-of-view frame F2 is also decomposed, based on the multi-virtual pinhole camera model, into sub-field-of-view frames F21, F22, F23, F24 and F25 respectively corresponding to each virtual pinhole camera. In this case, the sub-field-of-view frames F11 and F21 correspond to a forward facing virtual pinhole camera, the sub-field-of-view frames F12 and F22 correspond to an upwardly facing virtual pinhole camera, the sub-field-of-view frames F13 and F23 correspond to a downwardly facing virtual pinhole camera, the sub-field-of-view frames F14 and F24 correspond to a left-facing virtual pinhole camera, and the sub-field-of-view frames. F15 and F25 correspond to a right-facing virtual pinhole camera. Moreover, the matching feature points between the current large field-of-view frame and the reference large field-of-view frame can be determined by performing inter-frame matching with the sub-field-of-view frames F11 and F21, F12 and F22, F13 and F23, F14 and F24, and F15 and F25. Here, the matching of sub-field-of-view frames frame is used to determine the feature points where the two field-of-view frames match each other, and then to build new map points based on the direction vector triangulation.

The following describes the inter-frame matching by taking the sub-field-of-view frames F11 and F21 as an example.

First, the feature points of the sub-field-of-view frames F11 and F21 are matched to detect whether the number of matching feature point pairs is greater than or equal to an initialization threshold. If this number is less than the initialization threshold, the initialization fails. If the number of matching feature point pairs exceeds the initialization threshold, an essential matrix between the two frames is calculated based on the direction vector of the matching feature point pairs using, for example, a Random Sample Consensus (RANSAC) algorithm. The initialization threshold indicates the minimum number of feature point pairs required to initialize the step of constructing a map. A default value, such as 100, may be used directly, or it may be preset by a user.

Next, the relative pose between the current large field-of-view frame and the reference large field-of-view frame may be obtained by decomposing the essential matrix, wherein the relative pose may be represented by a pose matrix. Subsequently, based on the relative pose between the current large field-of-view frame and the reference large field-of-view frame, a triangulation measurement may be carried out with the matching feature point pair to obtain the three-dimensional coordinates of a map point corresponding to the feature point pair, that is, the position of the map point.

Figure 9:
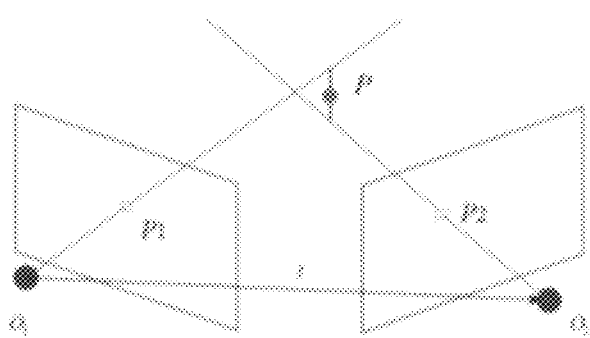
FIG. 9 is a schematic diagram of constructing a map point by a monocular large field-of-view camera, in accordance with some embodiments of the present disclosure.

As shown in FIG. 9, the point O1 is the camera center of the virtual pinhole camera corresponding to the sub-field-of-view frame F11, the point O2 is the camera center of the virtual pinhole camera corresponding to the sub-field-of-view frame F12, and p1 and p2 are matching feature points. Based on the direction of the vector O1p1 and the direction of the vector O2p2, the three-dimensional coordinates of the map point, that is, the position of the P point, can be determined. In SLAM, due to the influence of noise, there is a possibility that the vector O1p1 and the vector O2p2 have no intersection. In such a case, the least square method, for example, may be used to obtain the coordinates of the P point which the minimum error. The distance between O1 and O2 has a large impact on the error of triangulation. If this distance is too small, which means that the camera's translation is too small, an angular error for observing point P may cause a large depth error. While if this distance is too large, the overlap between scenes will be very small, which makes it difficult to perform feature matching. Therefore, a certain parallax is required between the current large field-of-view frame and the reference large field-of-view frame. If two selected large field-of-view frames do not meet the requirements, the initialization may fail. In such a case, these two large field-of-view frames may be discarded and a new initiation may be performed again.

Finally, based on the above triangulation, the three-dimensional coordinates of a map point are obtained to construct an initial map point. The three-dimensional coordinates are used as the coordinates of a map point, and the descriptor of the feature point corresponding to the three-dimensional coordinate is used as the descriptor of the map point.

For a binocular large field-of-view camera, the device of simultaneous localization and mapping 102 may perform the initialization steps of a monocular large field-of-view camera as described above; or it may construct the initial map based on the matching feature points between the left undistorted image and the right undistorted image at the same moment.

As an example, the device of simultaneous localization and mapping 102 may determine the matching feature points between a left undistorted image and a right undistorted image; and then construct an initial map based on the matching feature points.

In some embodiments, the device of simultaneous localization and mapping 102 may determine an epipolar line in the right undistorted image corresponding to a feature point in the left undistorted image; and then search, on the epipolar line, a feature point that matches the feature point in the left undistorted image, in which the epipolar line may be a multi-segment broken line.

Figure 10:
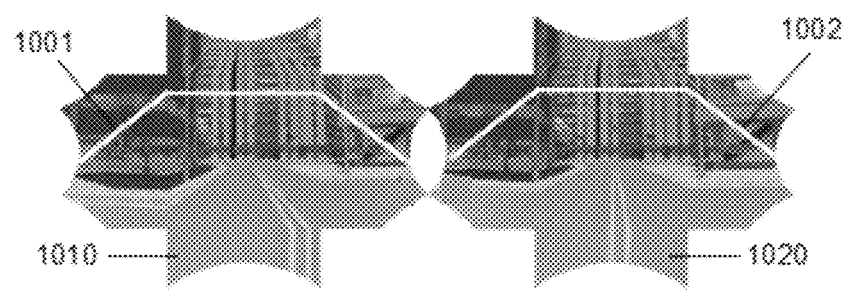
FIG. 10 is a schematic diagram of epipolar line searching by a binocular large field-of-view camera in accordance with some embodiments of the present disclosure.

Referring to FIG. 10, it shows a schematic diagram of binocular large field-of-view camera epipolar line search in accordance with some embodiments of the present application. The left undistorted image 1010 has an epipolar line 1001, and the right undistorted image 1020 has an epipolar line 1002. The feature point that matches the feature point in the left undistorted image 1010 must be located on the epipolar line 1002. In contrast, the feature point that matches the feature point of the right undistorted image 1020 must be located on the epipolar line 1001. Therefore, the matching feature points between the left undistorted image and the right undistorted image may be quickly found through epipolar line search.

As shown in the figure, the epipolar line 1001 and the epipolar line 1002 are three-segment broken lines, including two inclined line segments and one horizontal line segment.

As shown in the figure, the left undistorted image 1010 and the right undistorted image 1020 retain all angles-of-view of the left fisheye image and the right fisheye image, respectively. Simultaneous localization and mapping based on the left undistorted image 1010 and the right undistorted image 1020 may allow the construction of a map including the original content of all the angles-of-view.

In some embodiments, the step pf constructing the map based on the matching feature points includes: first, determining a direction vector corresponding to a first feature point based on a feature point in a left undistorted image and a left eye camera center of the large field-of-view camera 101; secondly, determining a direction vector corresponding to a second feature point based on the matching feature point in the right undistorted image and a right eye camera center of the large field-of-view camera 101; next, based on a baseline of the binocular fisheye camera, a triangulation process is carried out with the direction vector corresponding to the first feature point and the direction vector corresponding to the second feature point so as to determine a map point corresponding to the feature points; and finally, a map is constructed based on the map point.

Figure 11:
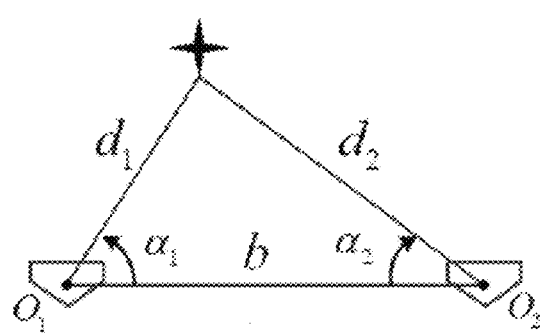
FIG. 11 is a schematic diagram of constructing a map point by a binocular large field-of-view camera, in accordance with some embodiments of the present disclosure.

Referring to FIG. 11, it shows a schematic diagram of constructing a map point of a binocular large field-of-view camera in accordance with some embodiments of the present application. Hereinafter, a front map point the large field-of-view camera 101 is taken as an example for the description.

The point O1 is the camera center of the left eye camera of the large field-of-view camera 101, and the direction vector corresponding to the first feature point is obtained by connecting the feature point in the left undistorted image and the point O1. The point O2 is the camera center of the right eye camera of the large field-of-view camera 101, and the matching feature point in the right undistorted image and the point O2 are connected to obtain the direction vector corresponding to the second feature point. In some embodiments, the direction vector corresponding to the first feature point and the direction vector corresponding to the second feature point may be unitized vectors.

The direction vector corresponding to the first feature point and the direction vector corresponding to the second feature point intersect at, point E, respectively obtaining a line segment O1E and a line segment O2E. The point O1 and the point O2 are then connected to obtain a line segment O1O2, where the length of the line segment O1O2 is b (i.e., the baseline of the large field-of-view camera 101). The line segment O1O2 forms a triangle with the line segment O1E and the line segment O2E. The triangle is then solved to obtain the length of the line segment O1E as d1, the length of the line segment O2E as d2, the angle between the line segment O1O2 and the line segment O1E, and the angle between the line segment O1O2 and the line segment O2E, and accordingly the coordinates of the map point E corresponding to the feature point may be obtained. Further in combination with the current pose of the large field-of-view camera 101, the map point E is converted from the coordinate system of the large field-of-view camera 101 to a world coordinate system. Then, a map may be constructed based on the position of the point E in the world coordinate system.

Specifically, the device of simultaneous localization and mapping 102 may perform triangulation measurement based on the following formulae. First, formula (1), (2) and (3) are obtained based on the sine and cosine theorem.

$$\frac{d_1}{\sin\alpha_2} = \frac{d_2}{\sin\alpha_1}, \quad \text{formula (1)}$$

$$2bd_1 \cos \alpha_1 = b^2 + d_1^2 - d_2^2, \quad \text{formula (2)}$$

$$2bd_2 \cos \alpha_2 = b^2 + d_2^2 - d_1^2, \quad \text{formula (3)}$$

Formulae (2) and (3) are then combined to obtain formula (4) as follows:

$$d_1 \cos \alpha_1 + d_2 \cos \alpha_2 = b, \quad \text{formula (4)}$$

Formulae (1) and (4) are then combined to obtain formula (5) as follows:

$$\begin{bmatrix} \cos\alpha_1 & \cos\alpha_2 \\ \sin\alpha_1 & -\sin\alpha_2 \end{bmatrix} \begin{bmatrix} d_1 \\ d_2 \end{bmatrix} = \begin{bmatrix} b \\ 0 \end{bmatrix}, \quad \text{formula (5)}$$

Meanwhile, in combination with formula (6) below, formulae (1), (2), (3), (4) and (5) are solved to obtain d1 and d2.

$$det\begin{bmatrix} \cos\alpha_1 & \cos\alpha_2 \\ \sin\alpha_1 & -\sin\alpha_2 \end{bmatrix} < 0, \quad \text{formula (6)}$$

In some embodiments, association processing is also required for newly constructed map points for the monocular large field-of-view camera and binocular large field-of-view camera. A map point can be observed in multiple key large field-of-view frames, and the key large field-of-view frames in which the map point is observed will be further associated with this map point; and the specific feature points of these key large field-of-view frames associated with this map point is recorded, that is, the feature points that may be used for measurement to obtain this map point. For the map point obtained in the above initialization, it is necessary to associate two key large field-of-view frames created by the initialization, and, record the feature points on these two key large field-of-view frames which are associated with the map point.

The initial map constructed includes information of the two key large field-of-view frames and the initial map point, as well as the association relationship, therebetween.

In some embodiments, the initialization step further includes: in the case where the number of matching feature point pairs exceeds an initialization threshold, constructing a vector based on a Bag of Words model based on the two key large field-of-view frames, and then the vector based on the Bag of Words model is added to a map database. In the Bag of Words model, clustering is performed according to various image features. For example, eye, nose, ear, mouth, edges and corners of various features are different feature classes. Suppose there are 10,000 classes. For each large field-of-view frame, analysis can be carried out to determine how many classes it may have, where 1 denotes it has a class, and 0 denoted that it has none. Then, this large field-of-view frame can be expressed by a 10000-dimensional vector. For different large field-of-view frames, their similarity can be determined by comparing their respective vectors based on the Bag of Words model. The map database may be used to store the vectors based on the Bag of Words model constructed according the key large field-of-view frames.

In 820, the device of simultaneous localization and mapping 102 may perform a global bundle optimization step. Global bundle optimization optimizes all key large field-of-view frames (or key binocular image frames) and all map points in a map currently created by SLAM (hereafter referred to as the current map). For example, the initial map constructed in step 810 may be globally bundled optimized, that is, the global bundle optimization of the map with only two key large video frames and map points described above is performed. It would be understood that, in addition to the initial map, the global bundle optimization may also be performed on the current map at any time during the process of constructing the map. The purpose of the bundle optimization is to minimize the re-projection error of map points in the map constructed by SLAM on key large field-of-view frames (or key binocular image frames) by fine-tuning the pose of the key large field-of-view frame (or key binocular image frames) and the positions of the map points in the map, thereby optimizing the map constructed.

For a monocular large field-of-view camera, the device of simultaneous localization and mapping 102 may project each map point associated with the key large field-of-view frame in the map to a multi-virtual pinhole camera model, so as to obtain the re-projection points of the map points in the multi-virtual pinhole camera model; determine a re-projection error of each map point, according to the re-projection point of each map point in the multi-virtual pinhole camera model and the feature point corresponding to the map point; determine a re-projection error according to the re-projection errors of all the map points associated with the key large field-of-view frame; and then update the pose of the key large field-of-view frame and the portions of all map points associated with the key large field-of-view frame based on the re-projection error.

It should be noted that, in the present application, the pose of a frame (for example, the pose of a key large field-of-view frame) is the pose of the large field-of-view camera 101 at the moment when the large field-of-view camera 101 acquires the frame, which is referred to as the pose of the frame for the sake of brevity.

Taking the multi-virtual pinhole camera model having five orientations shown in FIG. 4 as an example, the map point is transformed into the coordinate system of the corresponding virtual pinhole camera based on the multi-virtual pinhole camera model, for example, a forward facing virtual pinhole camera corresponding to the map point, which is then projected onto the imaging plane of the forward facing virtual pinhole camera to obtain a re-projection point of the map point. Since the multi-virtual pinhole camera model used herein is the same model as the multi-virtual pinhole camera model used in the large field-of-view image, undistortion process in step 220, this imaging plane corresponds to the sub-field-of-view frame of the forward facing virtual pinhole camera derived from decomposing the key large field-of-view frame. The re-projection point may be understood as an observation value of the map point based on the pose of the sub-field-of-view frame. The re-projection error of the map point may then be determined according to the feature point associated with the map point on the key large field-of-view frame (that is, the feature point based on which the map point is obtained by triangulation) and the re-projection point of the map point. Under an ideal condition that there is no error in a map established by SLAM, the re-projection error would be zero. However, because an error, such as measurement error, is inevitable under a real world condition, the re-projection error cannot be completely eliminated, hence SLAM optimizes an established map by means of minimizing the re-projection error.

For a binocular large field-of-view camera, the device of simultaneous localization and mapping 102 may project each map point associated with the key binocular image frame in the map into a first multi-virtual pinhole camera model to obtain a re-projection point of the map point in the first multi-virtual pinhole camera model; determine a re-projection error of the map point according to the re-projection point of the map point in the first multi-virtual pinhole camera model and a feature point corresponding to the map point; and then determine a left re-projection error based on there-projection errors of all the map, points associated with the key binocular image frame.

Alternatively, the device of simultaneous localization and mapping 102 may project each map point associated with the key binocular image frame in the map into, a second multi-virtual pinhole camera model to obtain a re-projection point of the map point in the second multi-virtual pinhole camera model; determine a re-projection error of the map point according to the re-projection point of the map point in the second multi-virtual pinhole camera model and a feature point corresponding to the map point; and then determine a right re-projection error based on the re-projection errors of all the map points associated with the key binocular image frame.

Further, the device of simultaneous localization and mapping 102 may update the pose of the key binocular image frame and the locations of all map points associated with the key binocular image frame, based on the left re-projection error, the right re-projection error, or a sum, of the two. Specifically, for a monocular map point, the device of simultaneous localization and mapping 102 may update the pose of the key binocular image frame and the locations of all map points associated with the binocular image frame based on the left re-projection error or the right re-projection error. For a binocular map point, the device of simultaneous localization and mapping 102 may update the pose of the key binocular image frame and the locations of all map points associated with the binocular image frame based on a sum of the left re-projection error and the right re-projection error.

In some embodiments, the device of simultaneous localization and mapping 102 may determine a loss function based on an re-projection errors (e.g., a left re-projection error, a right re-projection error, a sum of the left re-projection error and the right re-projection error). After the loss function is obtained, optionally, the respective gradients corresponding to the key large field-of-view frame (or key binocular image frame) and the locations of the map points associated with the key large field-of-view frame can be obtained through iteration by a gradient descent method, such as the Gauss-Newton method, Levenberg-Marquardt method, etc., and then update the pose of the key large field-of-view frame (or the key binocular image frame) and the locations of the map points associated therewith according to their respective gradients. Eventually, the current map reaches an optimal state thereof with the smallest re-projection error.

The aforementioned bundle optimization is based on the same multi-virtual pinhole camera model as, the large field-of-view image undistortion process described above, which transforming the complex projection model of a large field-of-view camera into a multi-virtual pinhole camera model. This may avoid the complex optimization process caused by the complex projection model of the large field-of-view camera, which improves the system processing performance.

In 830, the device of simultaneous localization and mapping 102 may perform a tracking step. The tracking step optimizes the pose of the current large field-of-view camera by minimizing the re-projection error of the map points on the current large field-of-view frame (or the current binocular image frame). In the tracking step, only the pose of the current large field-of-view camera is optimized, while the poses of the large field-of-view camera and the locations of the map points at other moments remain unchanged. Step 830 may be performed at any time during the process of constructing the map, such as constructing an initial map based on the initialization step 810 described above, or optimizing a map based on the global bundle optimization step 820 described above, the SLAM then continuously tracks the pose of the large field-of-view camera motion based on a new large field-of-view frame (or binocular image frame).

For a monocular large field-of-view camera, the device of simultaneous localization and mapping 102 may project each map point associated with the current large field-of-view frame into a multi-virtual pinhole camera model, and then determine respective re-projection points of the map points in the multi-virtual pinhole camera model; next determine a re-projection error of the map points according to a feature point of the map point corresponding to the map point in a re-projection point in the multi-virtual pinhole camera model; next determine a re-projection error of the map point according to the re-projecting point of the map point in the multi-virtual pinhole camera model and a feature point corresponding to the map point; next determine a re-projection error according to the re-projection errors of all the map points associated with the current large field-of-view frame; and update the pose of the current large field-of-view frame based on the re-projection error.

In some embodiments, the device of simultaneous localization and mapping 102 may perform the following three sub-steps to complete the tracking step.

Tracking sub-step 1: determine a reference large field-of-view frame of the current large field-of-view frame.

Optionally, determine a large field-of-view frame immediately before the current large field-of-view frame to be the reference large field-of-view frame.

Optionally, select a key large field-of-view frame in a local map that shares the highest degree of common view with the current large field-of-view frame to be a reference large field-of-view frame. For the case where the number of key large field-of-view frames in the current map is less than N, the local map includes all the key large field-of-view frames and all the map points in the current map, where N is an integer greater than 2. N may take a default value directly, such as 10, or it can be preset by a user. If the current map is an initialized map, the local map would be the current map, including the initial two key large field-of-view frames, and their associated map points. For the case where the number of key large field-of-view frames in the current map is not less than N, the local map would include at least N key large field-of-view frames in the current map that share the highest degree of common view the current large field-of-view frame and the map points associated with the at least N key large field-of-view frames.

Optionally, a key large field-of-view frame in a local map that share the highest degree of common view with the large field-of-view frame immediately before the current large field-of-view frame to be a reference large field-of-view frame. The current large field-of-view frame usually has a high degree of common view with its previous large field-of-view frame, so the reference large field-of-view of the current large field-of-view frame can be selected according to the latter (i.e., the large field-of-view frame immediately before the current one). Compared with a key large field-of-view frame that shares the highest degree of common view with the current large field-of-view frame just created, a key large field-of-view frame that shares the highest degree of common view with the large field-of-view frame immediately before the current large field-of-view frame can be obtained more easily, which thus makes it easier to implement the SLAM method.

Optionally, the reference large field-of-view frame may be determined through global matching. First, construct a vector based on a Bag of Words model according to the current large field-of-view frame, and then query the map database created in the initiation step 810 according to the vector based on the Bag of Words model, so as to obtain a key large field-of-view frame that matches the current large field-of-view frame to be a reference large field-of-view frame.

In one example, the current large field-of-view frame is matched with its previous large field-of-view frame to obtain a matching feature point pair. If the number of the matching feature point pairs is greater than a tracking threshold, it would be determined that the previous large field-of-view frame to be a reference large field-of-view frame. The tracking threshold indicates the minimum number of feature point pairs required to track the pose of the large field-of-view camera. It may directly take a default value, such as 20, or may be set by a user.

If the number of matching feature point pairs between the current large field-of-view frame and its previous large field-of-view frame is not greater than the tracking threshold, select a key large field-of-view frame in a local map that shares the highest degree of common view with the current large field-of-view frame or its previous large field-of-view frame, and then this key large field-of-view frame is matched with the current large field-of-view frame to obtain matching feature point pairs. In this case, if the number of matching feature point pairs is greater than the tracking threshold, it is determined that the key large field-of-view frame is a reference large field-of-view frame.

If the number of matching feature point pairs between the current large field-of-view frame and the key large field-of-view frame is not greater than the tracking threshold, the reference large field-of-view frame may be determined by global matching. The specific determination process is as described above, and will not be repeated herein.

Thus, a suitable reference large field-of-view frame for the current large field-of-view frame can be obtained which makes the SLAM tracking more accurate and the mapping process more efficient.

Tracking sub-step 2: determine the pose of the current, large field-of-view frame based on the multi-virtual pinhole camera model according to the current large field-of-view frame and the referenced reference large field-of-view frame selected above. In one example, the pose of the current large field-of-view frame may be determined by determining a relative pose between the current large field-of-view frame and the reference large field-of-view frame.

The current large field-of-view frame is then decomposed, based on the multi-virtual pinhole camera model, into respective sub-field-of-view frames corresponding to each virtual pinhole camera, and then the same operation is performed with the reference large field-of-view frame. Thus, for each virtual pinhole camera, two sub-field-of-view frames corresponding thereto are obtained. Among the sub-field-of-view frame pairs corresponding to different virtual pinhole cameras, the sub-field-of-view frames with the largest number of matching feature point pairs is selected. The relative pose between them may be obtained by inter-frame matching, the two sub-field-of-view frames in this sub-field-of-view frame pair. The inter-frame matching process of the sub-field-of-view frames is consistent with that in the initialization step 810, and details will not be described herein again.

Since each camera center of the virtual pinhole camera coincides with the camera center of the large field-of-view camera, each virtual pinhole camera in the multi-virtual pinhole camera model has a fixed rotation angle with the large field-of-view, and the rotation angle of each virtual pinhole camera corresponds to a determined rotation matrix. Thus, the pose matrix of the large field-of-view frame can be transformed into the pose matrix of the sub-field-of-view frames thereof via the corresponding rotation matrix. Conversely, the pose matrix of sub-field-of-view frames may also be transformed into a pose matrix of the large field-of-view frame via the corresponding rotation matrix.

The above solution converts the pose of the complex large field-of-view camera projection model into a pose based on a simple virtual pinhole camera projection model through a multi-virtual pinhole camera model, so that the algorithm of the large field-of-view SLAM is greatly simplified and the performance thereof is significantly improved.

Tracking sub-step 3: update the pose of the current large field-of-view frame obtained in the aforementioned tracking sub-step 2.

According to the matching feature point pairs between the current large field-of-view frame and the reference large field-of-view frame, for each matching feature point in the reference large field-of-view frame, the map point associated with the feature point is transformed to the coordinate system of the virtual pinhole camera corresponding to the current large field-of-view frame based on the multi-virtual pinhole camera model. Subsequently, the map point is projected onto an imaging plane of the virtual pinhole camera to obtain a re-projection point of the map point in the current large field-of-view frame.

In one example, there is a large parallax between the current large field-of-view frame and the reference large field-of-view frame. Processing is performed based on the multi-virtual pinhole camera model of five orientations as shown in FIG. 4. A matching feature point in the reference large field-of-view frame is located on an imaging plane of the left-facing virtual pinhole camera. A map point associated with the feature point is transformed based on the multi-virtual pinhole camera model to correspond to the coordinate system of the forward-facing virtual pinhole camera of the current large field-of-view frame, so as to obtain a re-projection point of the map point on an imaging plane of the forward-facing virtual pinhole camera of the current large field-of-view frame. Thus, it can be understood that the map point can be observed through the left-facing virtual pinhole camera of the multi-virtual pinhole camera model as the pose of the reference large field-of-view frame is consistent thereto, while the map point can also be observed through the forward-facing virtual pinhole camera of the multi-virtual pinhole camera model as the pose of the current large field-of-view frame is consistent thereto.

The re-projection error of the map point may be determined according to the re-projection point and the matching feature point in the current large field-of-view frame. The pose of the current large field-of-view frame is then updated according to the re-projection errors of the map points associated with all the matching feature points in the reference large field-of-view frame.

The re-projection error calculation and the process of updating the pose of the current large field-of-view frame according to the re-projection error in this step are consistent with those in the processing method of global bundle optimization as shown in step 820, and will not be described herein again.

By further optimizing and updating the pose of the current large field-of-view frame, the credibility of the pose of the current large field-of-view frame is improved, and the tracking error thereof is reduced. Thus, the SLAM tracking becomes more accurate and mapping more efficient.

For a binocular large field-of-view camera, the device of simultaneous localization and mapping 102 may project each map point associated with the current binocular image frame into a first multi-virtual pinhole camera model to obtain a re-projection point of the map point in the first multi-virtual pinhole camera model; determine a re-projection error of the map point according to a re-projection point of the map point in the first multi-virtual pinhole camera model and a feature point corresponding to the map point; and then determine a left re-projection error based on the re-projection errors of all map points associated with the current binocular image frame.

Alternatively, the device of simultaneous localization and mapping 102 may project each map point associated with the current binocular image frame into a second multi-virtual pinhole camera model to obtain a re-projection point of the map point in the second multi-virtual pinhole camera model; determine a re-projection error of the map point according to a re-projection point of the map point in the second multi-virtual pinhole camera model and a feature point corresponding to the map point; and then determine a right re-projection error based on the re-projection errors of all map points associated with the current binocular image frame.

Further, the device of simultaneous localization and mapping 102 may update the pose of the current binocular image frame based on the left re-projection error, the right re-projection error, or a sum of the two. For example, for a monocular map point, the device of simultaneous localization and mapping 102 may update the pose of the current binocular image frame based on a left re-projection error or a right re-projection error; while for a binocular map point, the device of simultaneous localization and mapping 102 may update the pose of the current binocular image frame based on a sum of the left re-projection error and the right re-projection error.

Specifically, the device of simultaneous localization and mapping 102 may solve the left re-projection error, the right re-projection error, or the sum of the left re-projection error and the right re-projection error to determine an increment in the pose of the large field-of-view camera 101; then, in combination with a-priori information, determine the current pose of the large field-of-view camera 101.

In some embodiments, the device of simultaneous localization and mapping 102 may calculate a left projection error and/or a right project error by some equations described below, and solve for the pose increment. Formula (7) is as follows:

$$u=KR_{C_iB}T_{BW}P, \quad \text{formula (7)}$$

where P denotes a map point in a world coordinate system, and may be expressed as a coordinate transformation matrix; the map point P may be transformed from the world coordinate system to a coordinate system of the multi-virtual pinhole camera model to be expressed as a rotation vector. The map point P may be transformed from the coordinate system of the multi-virtual pinhole camera model to, a coordinate system of one face of the multi-virtual pinhole camera model; K denotes a camera matrix of the pinhole cameras corresponding to each face of the virtual multi-pinhole camera, wherein the matrix contains camera parameters such as information of the image center and focal length. u denotes a re-projection point of the map point P on one face of the multi-virtual pinhole camera model.

As can be seen from the above description, the formula (7) can be further expressed as the formula (8).

$$u=KP_1, P_1=R_{C_iB}P_2, P_2=T_{BW}P, \quad \text{formula (8)}$$

where P2 denotes a projection point of the map point P in the coordinate system of the multi-virtual pinhole camera model; P1 denotes a projection point of the point P2 in the coordinate system of one face of the multi-virtual pinhole, camera model.

Therefore, the Jacobian matrix of u to the camera pose can be derived according to the chain rule, as shown in formula (9):

$$J_\xi = -\frac{\partial u}{\partial P_1} \cdot R_{C_iB} \cdot [-P_2^\wedge, I_{3\times3}], \quad \text{formula (9)}$$

where ... denotes the Jacobian matrix of from u to the camera pose, ... denotes an oblique-symmetric matrix, of P2.

According to formula (9), the Jacobian matrix of the map point P can be determined, which is expressed as follows:

$$J_P = -\frac{\partial u}{\partial P_1} \cdot \frac{\partial P_1}{\partial P} \quad \text{formula (10)}$$
$$= -\frac{\partial u}{\partial P_1} R_{C_iB} R_{BW},$$

where the Jacobian matrix of the map point P; ... denotes the rotation component of the coordinate transformation matrix For the large field-of-view camera 101, the device of simultaneous localization and mapping 102 may determine the left re-projection error of the large field-of-view camera 101 based on the formulae (7), (8), (9) and (10), and then determine the pose of the large field-of-view camera 101.

It should be understood that based on the same principle, the device of simultaneous localization and, mapping 102 may determine a right re-projection error of the large field-of-view camera 101; then, based on the right re-projection error or a sum of the left re-projection error and the right re-projection error, determine the pose of the large field-of-view camera 101.

Specifically, the right re-projection error can be determined by formula (11), where . . . denotes a re-projection point of the map point P on one face of the second multi-virtual pinhole camera model; denotes an offset of the left eye of the large field-of-view camera 101 with respect to the right eye thereof; b denotes a baseline length of the large field-of-view camera 101.

In 840, the device of simultaneous localization and mapping 102 may perform a mapping step (or a map updating step). The mapping step can expand the map with the movement of the large field-of-view camera based on the current map. In other words, the mapping step may add a new map point(s) to the current map. Optionally, the mapping step 840 may be performed after the tracking step 830. For the current large field-of-view frame (or the current binocular image frame); the pose thereof may be determined by tracking step 830, such that the pose of the large field-of-view camera movement at the current moment is also determined.

For a monocular large field-of-view camera, the device of simultaneous localization and mapping 102 may determine the feature points between the current large field-of-view frame and a reference frame thereof; determine a direction vector corresponding to a first feature point based on a feature point of the current large field-of-view frame and a camera center of the current large field-of-view camera; determine a direction vector corresponding to a second feature point based on a feature point of the current large field-of-view frame and a camera center of the current large field-of-view camera; and then a triangulation with the direction vector corresponding, to the first feature point and the direction vector corresponding to the second feature point to determine a map point corresponding to the feature point; and construct a map based on the map point.

In some embodiments, the device of simultaneous localization and mapping 102 may perform the following three sub-steps in order to complete the mapping, step.

Mapping sub-step 1: determine whether the current large field-of-view frame is a key large field-of-view frame.

Since the large field-of-view camera may collect data during continuous motion thereof, performing a map updating operation on each of the obtained large field-of-view frames will bring a huge amount of computation. Thus, certain large field-of-view frames considered important may be selected as key large field-of-view frames, and then the map updating operation may be performed based on the key large field-of-view frames. Any conventional or future developed technology may be employed to determine the key large field-of-view frames. For example, based on an initial key large field-of-view frame, one among every 10 large field-of-view frames may be selected as the key large field-of-view frame. That is, the 11th, 21st, 31st . . . large field-of-view frames may be selected as the key large field-of-view frames. For another example, a large field-of-view frame having a suitable parallax from its previous key large field-of-view frame may be selected as a key large field-of-view frame.

For the case where the current large field-of-view frame is a key large field-of-view frame, go to perform the map updating sub-step 2, where the map updating process is performed based on the current large field-of-view frame. For the case where the current large field-of-view frame is not a key large field-of-view frame, go to perform the map updating sub-step 3, a map point association processing is performed for the current large field-of-view frame.

Mapping sub-step 2: in the case where the current large field-of-view frame is a key large field-of-view frame, the map update processing is performed according to the current large field-of-view frame.

For each key large field-of-view frame in a local map, the key large field-of-view frame is decomposed, based on the multi-virtual pinhole camera model, into sub-field-of-view frames corresponding to each virtual pinhole camera respectively. The current large field-of-view frame is subject to the same processing. Thus, for each virtual pinhole camera, two sub-field-of-view frames corresponding thereto are obtained, and a new map point is then constructed through inter-frame matching between the two sub-field-of-view frames.

Optionally, in the process of inter-frame matching between two sub-field-of-view frames, vectors based on the Bag of Words model may be employed to accelerate the matching between feature points. For a feature point pair matched by the Bag of Words model, it is further tested whether it conforms to epipolar constraint. For a feature point pair that conforms to epipolar constraint, the three-dimensional coordinate points of a new map point may be obtained by triangulation based on the feature point pair.

Herein, the inter-frame matching processing of the sub-field-of-view frames and the process of obtaining the three-dimensional coordinate point of a new map point by triangulation based on the feature point pair are consistent with the corresponding processing in the initialization step 810, and thus will not be repeated again herein.

After a new map point is constructed, the new map point is transformed into a map point in a world coordinate system based on the pose of the current large field-of-view frame, which is then added to the current map, meanwhile the current large field-of-view frame is also added to the current map. In general, the coordinate system of the first key large field-of-view frame for constructing the map during initialization is used as a world coordinate system. Subsequently, a transformation between the camera coordinate system and the world coordinate system is needed.

A person of ordinary skill in the art will appreciate that the current map is gradually "growing" by means of continuously adding new map points and new key large field-of-view frames therein.

Optionally, a new vector based on the Bag of Words model is constructed according to the current large field-of-view frame, which is then added to the map database. Based on the map database, the feature point matching may be accelerated based on the Bag-of-Word-model-based vector, thereby improving the efficiency of SLAM tracking and mapping.

Mapping sub-step 3: in the case where the current large field-of-view frame is not a key large field-of-view frame, the current large field-of-view frame is subjected to the map point association processing.

For each map point in a local map, using the multi-virtual pinhole camera model, transform the map point to the coordinate system of the corresponding virtual pinhole camera of the current large field-of-view frame according to the pose of the current large field-of-view frame. The map point is then projected onto an imaging plane of the virtual pinhole camera to obtain a re-projection point of the map point in the current large field-of-view frame. If the foregoing projection fails, it indicates that the map, point cannot be observed from the pose of the current large field-of-view frame. If the projection is successful, it indicates that the map point can be observed from the pose of the current large field-of-view frame, and thus a re-projection point of the map point may be obtained. Among all the feature points of the current large field-of-view frame, a feature point near the re-projection point and best matching the map point is then selected for association with the map point. It can be understood that through the foregoing procedure, the current large field-of-view frame is associated with the map points that can be observed from the pose of the current large field-of-view frame. Thus, when processing a next large field-of-view frame, the foregoing current large field-of-view frame may be used as the previous large field-of-view frame for the next large field-of-view frame in a tracking process. In this way, the SLAM tracking becomes more consistent, the localization is more accurate, and the constructed map is more accurate as well.

For a binocular large field-of-view camera, the device of simultaneous localization and mapping 102 may perform the same mapping step of the monocular large field-of-view camera as described above; or a map may be constructed based on the matching feature points between a left undistorted image and a right undistorted image at the same moment.

For the latter case, the device of simultaneous localization and mapping 102 may determine a feature points between a current left undistorted image and the current right undistorted image; determine a direction vector corresponding to a first feature point based on a feature point of the current left undistorted image and a camera center of a left eye camera of the current binocular large field-of-view camera; determine a direction vector corresponding to a second feature point based on a feature point of the current right undistorted image and a camera center of a right eye camera of the current binocular large field-of-view camera; next perform a triangulation with the direction vector corresponding to the first feature point and the direction vector corresponding to the second feature point, so as to determine a map point corresponding to the feature point; and then construct a map based on the map point.

In some embodiments, for a binocular large field-of-view camera, the device of simultaneous localization and mapping 102 may determine a direction vector corresponding to the first feature point and a direction vector corresponding to the second feature point according to the related description in the initialization step 810, and then perform triangulation.

If the current large field-of-view frame (or current binocular image frame) is a key large field-of-view frame (or key binocular image frame), the mapping step 840 may further include local bundling optimization. The purpose of local bundling optimization is to minimize the re-projection error of a map point, of the local map on a key large field-of-view frame (or key binocular image frames) by means of fine-tuning the pose of the key large field-of-view frame (or key binocular image frame) in the local map and the location of the map point, thereby optimizing the map created.

For the monocular large field-of-view camera, the bundle optimization process for each key large field-of-view frame in the local map is as follows.

For each map point associated with the key large field-of-view frame, the map point is transformed into a coordinate system of the corresponding virtual pinhole camera based on the multi-virtual pinhole camera model, which is then projected onto an imaging plane of the virtual pinhole camera, so as to obtain a re-projection point of the map point; based on a feature point associated with the map point and the re-projection point of the map point, a re-projection error of the map point may be determined; the pose of the key large field-of-view frame and the locations of all map points associated with the key large field-of-view frame may be then updated according to the re-projection errors of all map points associated with the key large field-of-view frame. The bundle optimization process in this step is consistent with the process in the global bundle optimization step 820 described above, and thus will not be described herein again.

For a binocular large field-of-view camera, the bundle optimization process for each key binocular image frame in the local map is as follows.

A map point associated with the key binocular image frame may be projected to a first multi-virtual pinhole camera model to obtain a re-projection point of the map point in the first multi-virtual pinhole camera model; according to this re-projection point of the map point in the first multi-virtual pinhole camera model and a feature point corresponding to the map point, a re-projection error of the map point may be determined; and then a left re-projection error may be determined based on the re-projection errors of all map points associated with the key binocular image frame.

Alternatively, a map point associated with the key binocular image frame may be projected to a second multi-virtual pinhole camera model to obtain a re-projection point of the map point in the second, multi-virtual pinhole camera model; according to this re-projection point of the map point in the first multi-virtual pinhole camera model and a feature point corresponding to the map point, a re-projection error of the map point may be determined; and then a right re-projection error may be determined based on the re-projection errors of all map points associated with the key binocular image frame.

Further, the pose of the key binocular image frame and the portions of all map points associated with the key binocular image frame may be updated based on the left re-projection error, the right re-projection error, or a sum of the left re-projection error, the right re-projection error.

In 850, the device of simultaneous localization and mapping 102 may perform a closed loop detection processing step. The closed-loop detection processing step for both the monocular large field-of-view camera and the binocular large field-of-view camera may be the same. The closed loop detection process of a monocular large field-of-view camera is taken as an example in the following description.

For the case where the current large field-of-view frame is a key large field-of-view frame, a vector based on the Bag of Words model may detect a closed loop large field-of-view frame similar to the current large field-of-view frame in the current map database.

A matching feature point pair between the closed loop large field-of-view frame and the current large field-of-view frame may be determined. Alternatively, a vector based on the Bag of Words model may be used to accelerate the feature point matching.

Based on the matching feature point pair between the closed loop large field-of-view frame and the current large field-of-view frame, a similar transformation matrix between the closed-loop large field-of-view frame and the current large field-of-view frame may be further calculated by the similar transform operator (Sim3Solver) and the RANSAC algorithm.

For each matching feature point in the current large field-of-view frame, using the multi-virtual pinhole camera model, a map point associated with the feature point is transformed to the coordinate system of a corresponding virtual pinhole camera of the closed-loop large field-of-view frame. The map point is then projected onto an imaging plane of the virtual pinhole camera to obtain a re-projection point of the map point in the closed-loop large field-of-view frame. According to the foregoing re-projection point and a matching feature point in in the closed-loop large field-of-view frame, a first re-projection error may be determined; and then according to the first re-projection errors of all matching feature points in the current large field-of-view frame, a first accumulated re-projection error may be further determined.

For each matching feature point in the current large field-of-view frame, a map point associated with the feature point is transformed to a coordinate system of a corresponding virtual pinhole camera of the closed-loop large field-of-view frame based on the multi-virtual pinhole camera model. The map point is then projected onto an imaging plane of the virtual pinhole camera to obtain a re-projection point of the map point in the closed-loop large field-of-view frame. According to the foregoing re-projection point and a matching feature point in in the closed-loop large field-of-view frame, a second re-projection error may be determined; and then according to the second re-projection errors of all matching feature points in the current large field-of-view frame, a second accumulated re-projection error may be further determined.

According to the first accumulated re-projection error and the second accumulated re-projection error, a loss function may be determined. The above similar transformation matrix may be then optimized by minimizing the loss.

In order to eliminate an accumulated error in the closed loop process, it is necessary to correct a key large field-of-view frame in the current map which share a common view with the current large field-of-view frame and map points associated therewith. First, key large field-of-view frame in the current map which share a common view with the current large field-of-view frame is obtained, wherein, if a number of common map points observed by two large field-of-view frames is greater than a common view threshold, it indicates that the two large field-of-view frames share a common view, in which the common view threshold is the minimum number of common map points required to determine that two key large field-of-view frames have a common view relationship. It may use a default value directly, such as 20, or may be a value preset by a user. Next, the poses of the key large field-of-view frames and the locations of the map points associated with these key large field-of-view frames may be corrected by the similar transformation matrix described above, so, as to complete the closed loop detection process.

With the movement of the large field-of-view camera, both the pose of the large field-of-view camera and the locations of the map points obtained by triangulation obtained through tracking and calculation may become inaccurate. Even if the local bundling optimization or global bundling optimization is employed for optimization, cumulated errors may still exist. Through the aforementioned closed-loop detection process, the cumulated errors may be effectively eliminated, thereby making the map constructed by SLAM more accurate.

Optionally, the closed loop detection process may also include further optimizing the pose of all key large field-of-view frames and the locations of all map points in the current map by pose-graph optimization. Optionally, the closed loop detection process may also include finding and eliminating redundant key frames and map points to save system memory space while avoiding redundant computational operations.

Steps 810 through 850 in the above examples present an embodiment of step 230 of a large field-of-view SLAM based on a multi-virtual pinhole camera model. It will be appreciated that, based on the undistorted image acquired in step 220, any conventional or future developed large field-of-view SLAM method may be employed herein. For example, the above-described updating optimization process through re-projection error calculation based on the multi-virtual pinhole camera model may be replaced with an updating optimization process based on the unit direction vector error calculation. The calculation based on the unit direction vector error may reach a final optimization goal by means of minimizing a difference between the unit direction, vector corresponding to a map point and the unit direction vector corresponding to a feature point associated with the map point. The optimized target loss may be a distance between the unit direction vectors, an angle between the unit vectors, or other indicators describing an vector error.

Finally, it should be noted that the "left" and "right" mentioned in the present disclosure, such as "left eye", "right eye", "left fisheye image", "right fisheye image", "left undistorted image", "Right undistorted image", "left re-projection error", and "right re-projection error" are for illustration purposes only and do not limit the scope of protection of this disclosure.

In summary, after reading this detailed disclosure, those skilled in the art can understand that the detailed disclosure may be presented as an example only and may not be limiting. Although not explicitly stated herein, those skilled in the art can understand that the present disclosure is intended to cover various reasonable changes, improvements and modifications to the embodiments. These changes, improvements, and modifications are intended to be presented in this disclosure and within the spirit and scope of the exemplary embodiments of this disclosure.

In addition, certain terms in this application are used to describe embodiments of the present disclosure. For example, "one embodiment", "an embodiment" and/or "some embodiments" means that a particular feature, structure, or characteristic described in connection with the embodiment can be included in at least one embodiment of the present disclosure. Thus, it may be emphasized and understood that two or more references to "an embodiment" or "an embodiment" or "alternative embodiment" in various parts of this specification do not necessarily all refer to the same embodiment. Furthermore, the particular features, structures, or characteristics may be combined as appropriate in one or more embodiments of the present disclosure.

It should be understood that, in the foregoing description of the embodiments of the present disclosure, in order to help understand a feature, for the purpose of simplifying the present disclosure, sometimes various features are, combined in a single embodiment, drawing, or description. Alternatively, the present disclosure disperses various features in multiple embodiments. However, this is not to say that a combination of these features is necessary, and it is entirely possible for those skilled in the art when reading this disclosure to extract some of these features as a separate embodiment to understand. That is, the embodiments in this disclosure can also be understood as the integration of multiple secondary embodiments. It is also true that the content of each secondary embodiment is less than all the features of a single previously disclosed embodiment.

In some embodiments, numbers expressing quantities or properties used to describe and claim certain embodiments of the present application are understood to be modified in some cases by the terms "about", "approximately" or "substantially". For example, unless otherwise stated, "about", "approximately" or "substantially" may indicate a variation of about 20% of the value described. Accordingly, in some embodiments, the numerical parameters set forth in the written description and appended claims are approximations that can vary according to the desired nature that the particular embodiments seek to obtain. In some embodiments, numerical parameters should be interpreted in terms of the number of significant figures reported and by applying common rounding techniques. Although some embodiments set forth in this disclosure list a wide range of numerical ranges and approximate values for parameters, specific embodiments list values as precise as, possible.

Each patent, patent application, publication of patent application, and other materials, cited herein, such as articles, books, instructions, publications, documents, articles, etc., may be incorporated herein by reference. The entire contents for all purposes, except for the history of any prosecution documents related to them, any that may be inconsistent or conflict with this document, or any identical prosecution documents that may have a restrictive effect on the broadest scope of the claims history, associated with this document now or later. For example, if there is any inconsistency or conflict between the descriptions, definitions, and/or use of the terms associated with any of the materials, contained in this document, the terms in this document shall prevail.

Finally, it should be understood that the embodiments disclosed herein are illustrative of the principles of the embodiments of the disclosure. Other modified embodiments are also within the scope of this disclosure. Therefore, the embodiments disclosed in this disclosure are merely examples and are not limiting. Those skilled in the art may implement alternative configurations according to the embodiments in this disclosure to implement the invention in this disclosure. Therefore, the embodiments of the present disclosure are not limited to those which have been precisely described in the application.

What is claimed is:

1. A method of simultaneous localization and mapping, comprising:
    obtaining a large field-of-view image by a large field-of-view camera;
    obtaining a undistorted image corresponding to the large field-of-view image based on a multi-virtual pinhole camera model; and
    determining a pose of the large field-of-view camera and constructing a map based on the undistorted image,
    wherein the multi-virtual pinhole camera model includes at least two virtual pinhole cameras of different orientations, and camera centers of the at least two differently oriented virtual pinhole cameras coincide with a camera center of the large field-of-view camera.

2. The method of simultaneous, localization and, mapping according to claim 1, wherein the large field-of-view camera is a monocular large field-of-view camera; the determining of the pose of the large field-of-view camera and constructing of the map based on the undistorted image includes an initialization step, the initialization step includes:
    obtaining a undistorted image corresponding to a first moment and an undistorted image corresponding to a second moment;
    determining matching feature points between the undistorted image corresponding to the first moment and the undistorted image corresponding to the second moment; and
    constructing an initial map based on the matching feature points.

3. The method of simultaneous localization and mapping according to claim 2, wherein the constructing of the initial map based on the matching feature point includes:
    determining a direction vector corresponding to a first feature point, based on a feature point of the undistorted image corresponding to the first moment and the camera center of the large field-of-view camera at the first moment;
    determining a direction vector corresponding to a second feature point, based on a feature point of the undistorted image corresponding to the second moment and the camera center of the large field-of-view camera at the second moment;
    performing a triangulation with the direction vector corresponding to the first feature point and the direction vector corresponding to the second feature point, and determining map points corresponding to the feature points; and
    constructing the initial map based on the map points.

4. The method of simultaneous localization and mapping according to claim 1, wherein the large field-of-view camera is a monocular large field-of-view camera; the determining of the pose of the large field-of-view camera and constructing of the map based on the undistorted image includes a global bundle optimization step, and the global bundle optimization step includes:
    for each key large field-of-view frame in the map,
    projecting each map point associated with the key large field-of-view frame into a multi-virtual pinhole camera model to obtain re-projection points of the map points in the multi-virtual pinhole camera model; determining re-projection errors of the map, points according to the re-projection points of the map points in the multi-virtual pinhole camera model and feature points corresponding to the map points; determining a re-projection error according to the re-projection errors of all the map points associated with the key large field-of-view frame; and
    updating the pose of the key large field-of-view frame and locations of all map points associated with the key large field-of-view frame based on the re-projection error.

5. The method of simultaneous localization and mapping according to claim 1, wherein the large field-of-view camera is a monocular large field-of-view camera; the determining of the pose of the large field-of-view camera and constructing of the map based on the undistorted image includes a tracking step, and the tracking step includes:
    for each map point associated with a current large field-of-view frame,
    projecting the map point into a multi-virtual pinhole camera model to obtain a re-projection point of the map point in the multi-virtual pinhole camera model;
    determining a re-projection error of the map point according to the re-projection point of the map point in the multi-virtual pinhole camera model and a feature point corresponding to the map point;
    determining an overall re-projection error according to all of the re-projection errors of the map points associated with the current large field-of-view frame; and updating the pose of the current large field-of-view frame based on the re-projection error.

6. The method of simultaneous localization and mapping according to claim 1, wherein the large field-of-view camera is a monocular large field-of-view camera; the determining of the pose of the large field-of-view camera and constructing of the map based on the undistorted image includes a mapping step, and the mapping step includes:
   determining matching feature points between a current field-of-view frame and a reference frame thereof;
   determining a direction vector corresponding to a first feature point based on the feature points of the current large field-of-view frame and a camera center of a current large field-of-view camera;
   determining a direction vector corresponding to a second feature point based on the matching feature points of the reference frame and a camera center of the current large field-of-view camera corresponding to the reference frame;
   performing a triangulation with, the direction vector corresponding to the first feature point and the direction vector corresponding to the second feature point to determine map points corresponding to the feature points; and
   constructing the map based on the map points.

7. The method of simultaneous localization and mapping according to claim 6, wherein the mapping step further includes a local bundle optimization step, the local bundle optimization step includes:
   for each key large field-of-view frame in a local map,
      projecting each map point associated with the key large field-of-view frame into a multi-virtual pinhole camera model to obtain re-projection points of the map points in the multi-virtual pinhole camera model;
      determining re-projection errors of the map points according to the re-projection points of the map points in the multi-virtual pinhole camera model and the feature points corresponding to the map points;
      determining a re-projection error according to the re-projection errors of all the map points associated with the key large field-of-view frame; and
      updating a pose of the key large field-of-view frame and locations of all map points associated with the key large field-of-view frame based on the re-projection error.

8. The method of simultaneous, localization and mapping according to claim 1, wherein the large field-of-view camera is a binocular large field-of-view camera; the method includes:
   obtaining a left field-of-view image and a right field-of-view image by a binocular large field-of-view camera;
   obtaining a left undistorted image corresponding to the left field-of-view image based on a first multi-virtual pinhole camera model;
   obtaining a right undistorted image corresponding to the right field-of-view image based on a second multi-virtual pinhole camera model;
   determining a pose of the binocular large field-of-view camera and constructing a map based on the left undistorted image and the right undistorted image,
   wherein the first multi-virtual pinhole camera model includes at least two virtual pinhole cameras of different orientations, and camera centers of the at least two differently oriented virtual pinhole cameras coincide with a camera center of a left camera of the binocular large field-of-view camera;
   the second multi-virtual pinhole camera model includes at least two virtual pinhole cameras of different orientations, and camera centers of the at least two differently oriented virtual pinhole cameras coincide with a camera center of a right camera of the binocular large field-of-view camera.

9. The method of simultaneous localization and mapping according to claim 8, wherein the determining of the pose of the binocular large field-of-view camera and constructing of the map based on the left undistorted image and the right undistorted image includes an initialization step, the initialization step includes:
   determining matching feature points between the left undistorted image and the right undistorted image; and
   constructing, an initial map based on the matching feature points.

10. The method of simultaneous localization and mapping according to claim 9, wherein the determining matching feature points between the left undistorted image and the right undistorted image includes:
   determining epipolar lines in the right undistorted image corresponding to the feature points of the left undistorted image; and
   searching, on the epipolar lines, for feature points that match the feature points of the left undistorted image, wherein the epipolar lines are each, a multi-segment broken line.

11. The method of simultaneous localization and mapping according to claim 9, wherein the constructing of the initial map based on the matching feature points includes:
   determining a direction vector corresponding to a first feature point, based on feature points of the left undistorted image and a camera center of the left camera of the large field-of-view camera;
   determining a direction vector corresponding to a second feature point, based on the matching feature points of the right undistorted image and a camera center of the right camera of the large field-of-view camera;
   performing a triangulation with the direction vector corresponding to the first feature point and the direction vector corresponding to the second feature point based on a baseline of the binocular large field-of-view camera, determining map points corresponding to the feature points; and
   constructing the initial map based on the map points.

12. The method of simultaneous localization and mapping according to claim 8, wherein the determining of the pose of the binocular large field-of-view camera and constructing of the map based on the left undistorted image and the right undistorted image includes a global bundle optimization step, and the global bundle optimization step includes:
   for each key binocular image frame in the map,
      projecting map points associated with the key binocular image frame to a first multi-virtual pinhole camera model to obtain re-projection points of the map points in the first multi-virtual pinhole camera model; determining re-projection errors of the map points according to the re-projection points of the map points in the first multi-virtual pinhole camera model and feature points corresponding to the map points; determining a left re-projection error according to the re-projection errors of all the map points associated with the key binocular image frame; or
      projecting map points associated with the key binocular image frame into a second multi-virtual pinhole camera model to obtain re-projection points of the map points in the second multi-virtual pinhole camera model; determining re-projection errors of the map points according to the re-projection points of the map points in the second multi-virtual pinhole camera model and feature points corresponding to the map points; determining a right re-projection error according to the re-projection errors of all the map points associated with the key binocular image frame; and updating a pose of the key binocular image frame and locations of all map points associated with the key binocular image frame based on the left re-projection error, the right re-projection error, or a sum of the left re-projection error and the right re-projection error.

13. The method of simultaneous localization and mapping according to claim 8, wherein the determining of the pose of the binocular large field-of-view camera and constructing of the map based on the left undistorted image and the right undistorted image includes a tracking step, and the tracking step includes:

for each map point associated with a current binocular image frame,
projecting the map point into a first multi-virtual pinhole camera model to obtain a re-projection point of the map point in the first multi-virtual pinhole camera model; determining a re-projection error of the map point according to the re-projection point of the map point in the first multi-virtual pinhole camera model and a feature point corresponding to the map point, determining a left re-projection error according to the re-projection errors of the all of map points associated with the current binocular image frame; or projecting the map point into a second multi-virtual pinhole camera model to obtain a re-projection point of the map point in the second multi-virtual pinhole camera model; determining a re-projection error of the map point according to the re-projection point, of the map point in the second multi-virtual pinhole camera model and a feature point corresponding to the map point; determining a right re-projection error according to all of the re-projection errors of the map points associated with the current binocular image frame; and updating a pose of the current binocular image frame based on the left re-projection error, the right re-projection error, or a sum of the left re-projection error and the right re-projection error.

14. The method of simultaneous localization and mapping according to claim 8, wherein the determining a pose of the binocular large field-of-view camera and constructing a map based on the left undistorted image and the right undistorted image includes a mapping step, and the mapping step includes:

determining matching feature points, between a current left undistorted image and a current right undistorted image;

determining a direction vector corresponding to a first feature point based on the feature points of the current left undistorted image and a camera center of a current binocular large field-of-view camera;

determining a direction vector corresponding to a second feature point based on the feature points of the current right undistorted image and the camera center of the current binocular large field-of-view camera;

performing a triangulation with the direction vector corresponding to the first feature point and the direction vector corresponding to the second feature point, determining map points corresponding to the feature points; and constructing a map based on the map points.

15. The method of simultaneous localization and mapping according to claim 14, wherein the mapping step further includes a local bundle optimization step, the local bundle optimization step includes:

for each key binocular image frame in a local map,
projecting each map point associated with the key binocular image frame into a first multi-virtual pinhole camera model to obtain re-projection points of the map points in the first multi-virtual pinhole camera model; determining re-projection errors of the map points according to the re-projection points of the map points in the first multi-virtual pinhole camera model and feature points corresponding to the map points; determining a left re-projection error according to the re-projection errors of all the map points associated with the key binocular image frame; or projecting each map point associated with the key binocular image frame into a second multi-virtual pinhole camera model to obtain re-projection points of the map points in the second multi-virtual pinhole camera model; determining re-projection errors of the map points according to the re-projection points of the map points in the second multi-virtual pinhole camera model and feature points corresponding to the map points; determining a right re-projection error according to the re-projection errors of all the map points associated with the key binocular image frame; and updating a pose of the key binocular image frame and locations of all map points associated with the key binocular image frame based on the left re-projection error, the right re-projection error, or a sum of the left re-projection error and the right re-projection error.

16. The method of simultaneous localization and mapping according to claim 1, wherein the determining of the pose of the large field-of-view camera and constructing of the map based on the undistorted image includes a step of closed-loop detection and processing, and the step of closed-loop detection and processing includes:

determining a closed-loop large field-of-view frame in a map database similar to a current large field-of-view frame, when the current large field-of-view frame is a key large field-of-view frame;

determining matching feature points between the current large field-of-view frame and the closed-loop large field-of-view frame;

for each matching feature point in the current large field-of-view frame, a map point associated with the feature point is transformed into a coordinate system of a multi-virtual pinhole camera model corresponding to the closed-loop large field-of-view frame, and then projected to an imaging plane of the multi-virtual pinhole camera model to obtain a re-projection point of the map point in the closed-loop large field-of-view frame, and determining a first re-projection error according to the re-projection point and the matching feature point in the closed-loop large field-of-view frame;

determining a first accumulated re-projection error according to the first re-projection errors of all matching feature points in the current large field-of-view frame;

for each matching feature point in the closed-loop large field-of-view frame, a map point associated with the feature point is transformed into a coordinate system of a multi-virtual pinhole camera model corresponding to the current large field-of-view frame, and then projected to an imaging plane of the multi-virtual pinhole camera model to obtain a re-projection point of the map point in the current large field-of-view frame, and determining a second re-projection error according to the re-projection point and matching feature point in the current large field-of-view frame;

determining a second accumulated re-projection error according to the second re-projection errors of all matching feature points in the closed-loop large field-of-view frame; and correcting a key large field-of-view frame in the map that has a common view relationship with the current large field-of-view frame and map points associated therewith using the first accumulated re-projection error and the second accumulated re-projection error.

17. The method of simultaneous localization and mapping according to claim 1, wherein the at least two different orientations include a front-facing orientation, an upper-facing orientation, a lower-facing orientation, a left-facing orientation, or a right-facing orientation of a cube.

18. A device of simultaneous localization and mapping, comprising:
at least one storage device including a set of instructions; and
at least one processor in communication with the at least one storage device, wherein when the set of instructions are executed, the at least one processor is configured to cause the simultaneous positioning and mapping device to:
obtain a large field-of-view image by a large field-of-view camera;
obtain an undistorted image corresponding to the large field-of-view image based on a multi-virtual pinhole camera model; and
determine a pose of the large field-of-view camera and construct a map based on the undistorted image,
wherein the multi-virtual pinhole camera model includes at least two virtual pinhole cameras of different orientations, and camera centers of the at least, two differently oriented virtual pinhole cameras coincide with a camera center of the large field-of-view camera.

19. The device of simultaneous localization and mapping according to claim 18, wherein the large field-of-view camera is a monocular large field-of-view camera; and in order to determine the pose of the large field-of-view camera and construct the map based on the undistorted image, the at least one processor is further configured to cause the device of simultaneous, localization and mapping to perform an initialization step, the initialization step includes:
obtaining an undistorted image corresponding to a first moment and an undistorted image corresponding to a second moment;
determining matching feature points between the undistorted image corresponding to the first moment and the undistorted image corresponding to the second moment; and
constructing an initial map based on the matching feature points.

20. A non-transitory computer readable medium comprising a computer program product, the computer program product comprising instructions for causing a computing device to:
obtain a large field-of-view image by a large field-of-view camera;
obtain an undistorted image corresponding to the large field-of-view image based on a mufti-virtual pinhole camera model; and
determine a pose of the large field-of-view camera and construct a map based on the undistorted image,
wherein the multi-virtual pinhole camera model includes at least two virtual pinhole cameras of different orientations, and camera centers of the at least two differently oriented virtual pinhole cameras coincide with a camera center of the large field-of-view camera.

* * * * *